United States Patent [19]
Damon

[11] Patent Number: 5,181,325
[45] Date of Patent: Jan. 26, 1993

[54] SYSTEM FOR DUPLICATING BOWLING BALL FINGER AND THUMB HOLES

[76] Inventor: Gary Damon, 6750 Regional St., Dublin, Calif. 94568

[21] Appl. No.: 908,036

[22] Filed: Jul. 6, 1992

[51] Int. Cl.⁵ .............................................. G01B 3/14
[52] U.S. Cl. .................................... 33/510; 33/21.2; 33/562
[58] Field of Search ............. 33/509, 510, 21.2, 21.1, 33/562; 434/141, 131, 284, 287, 289

[56] References Cited

U.S. PATENT DOCUMENTS

| | | |
|---|---|---|
| 2,706,338 | 4/1955 | Ackerman et al. |
| 3,063,163 | 11/1962 | Dukes ................................. 434/131 |
| 3,100,353 | 8/1963 | Chamberlin ......................... 434/141 |
| 3,161,041 | 12/1964 | Amburgey . |
| 3,429,049 | 2/1969 | Snoddy . |
| 3,878,762 | 4/1975 | Goldsmith . |
| 4,191,357 | 3/1980 | Nesbitt . |
| 4,242,801 | 1/1981 | Ellison . |
| 4,257,165 | 3/1981 | Ellison . |
| 4,742,620 | 5/1988 | Manker . |
| 5,092,054 | 3/1992 | Cipiti . |

Primary Examiner—Harry N. Haroian
Attorney, Agent, or Firm—Thomas R. Lampe

[57] ABSTRACT

A system for transferring finger and thumb hole locations from a first bowling ball having finger and thumb holes to a second bowling ball which employs a transparent template marked to show the hole locations and the location of the first bowling ball positive axis point. The template is applied to the second bowling ball and that ball marked through the marks indicating the hole locations.

15 Claims, 4 Drawing Sheets

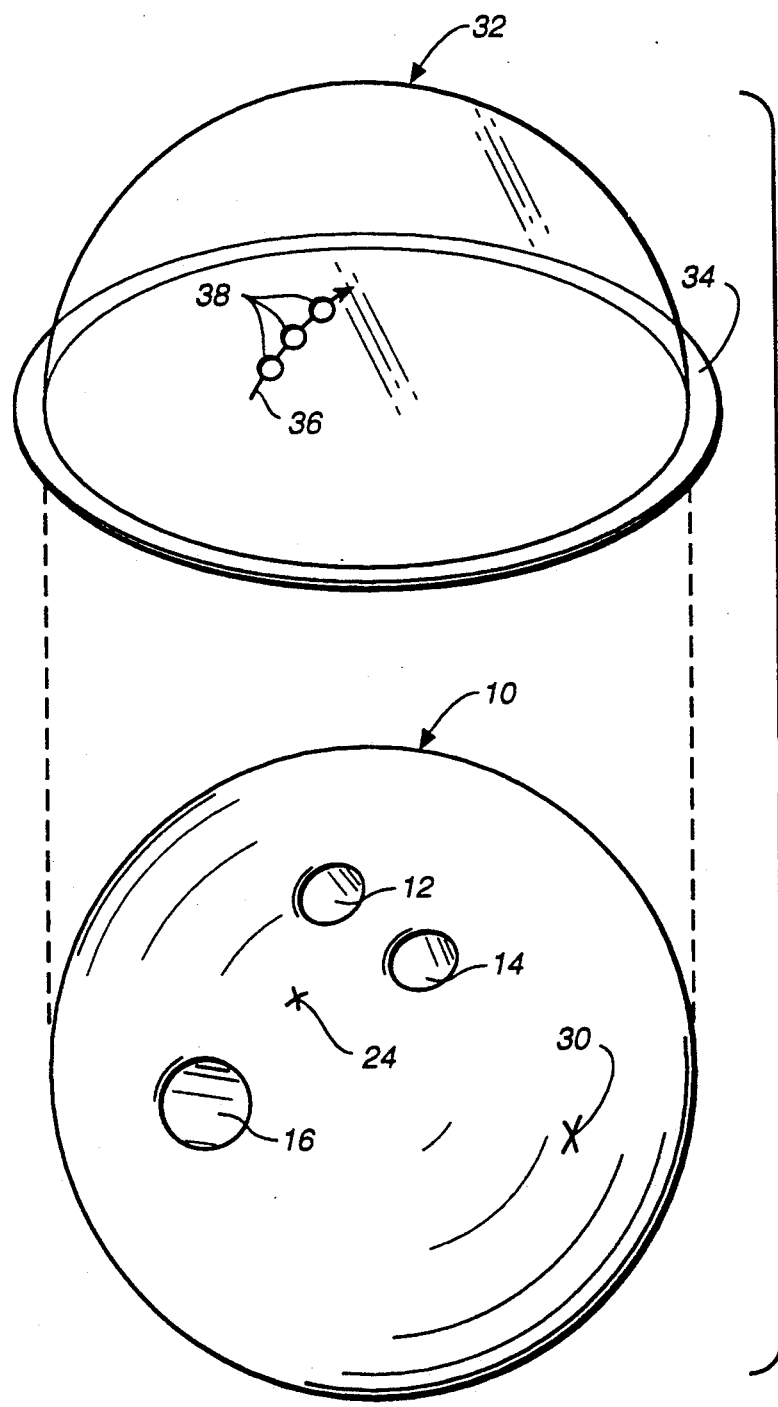

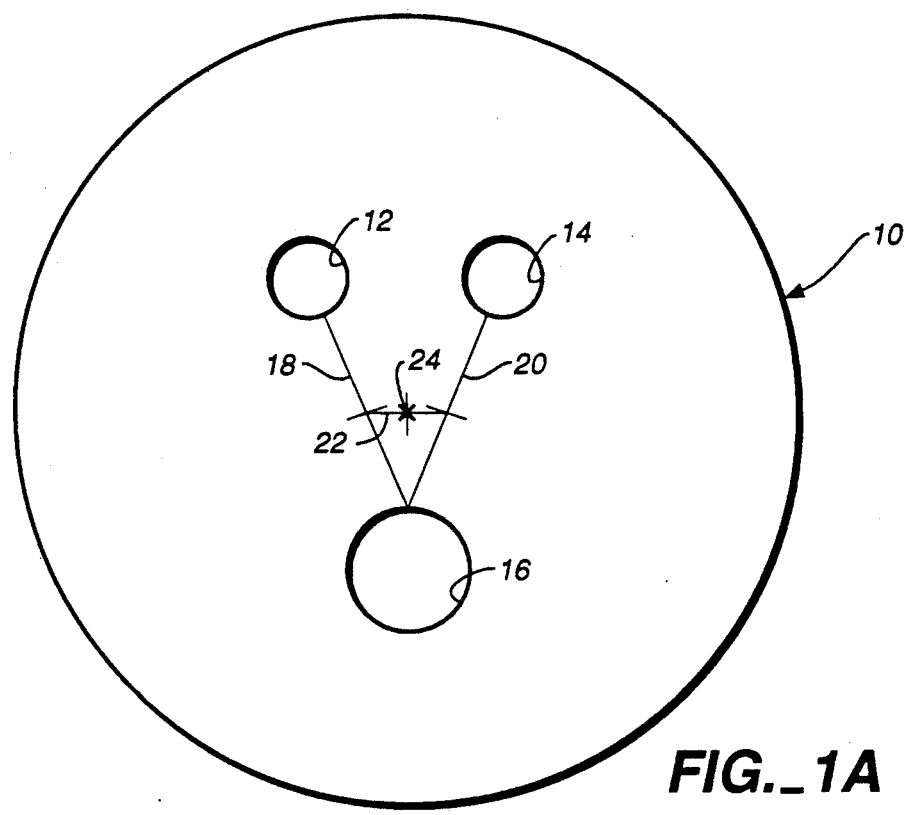
FIG._1A
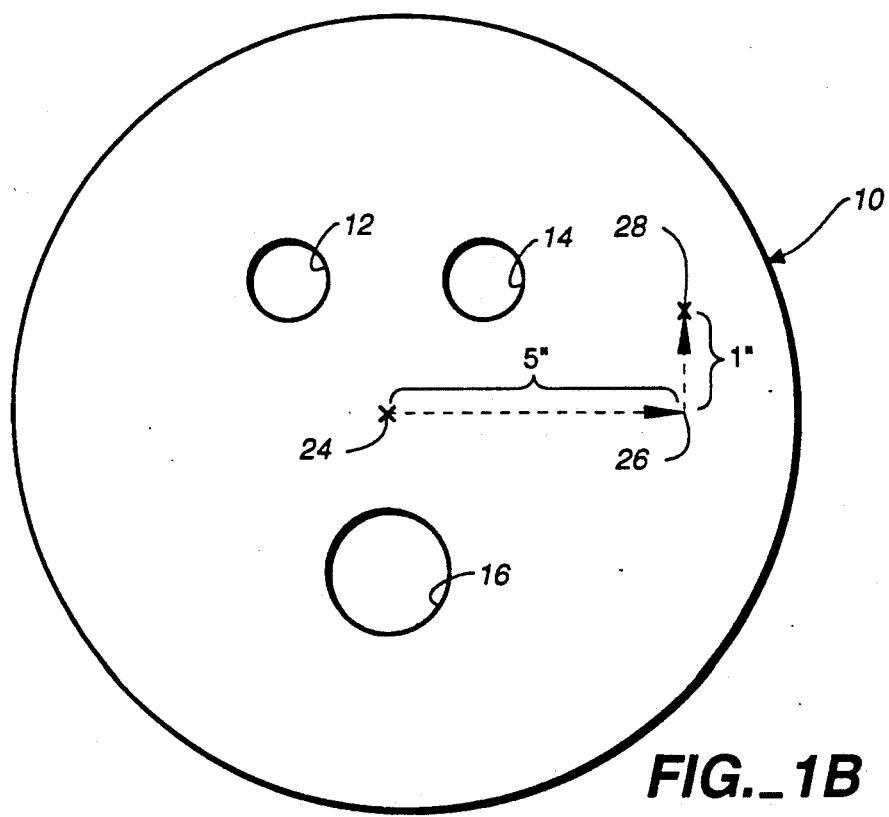
FIG._1B

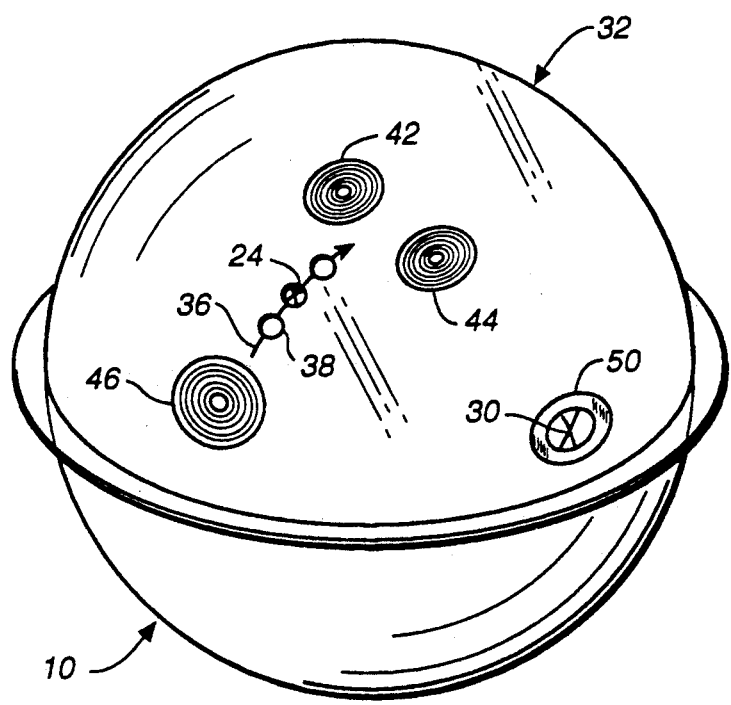
FIG._2
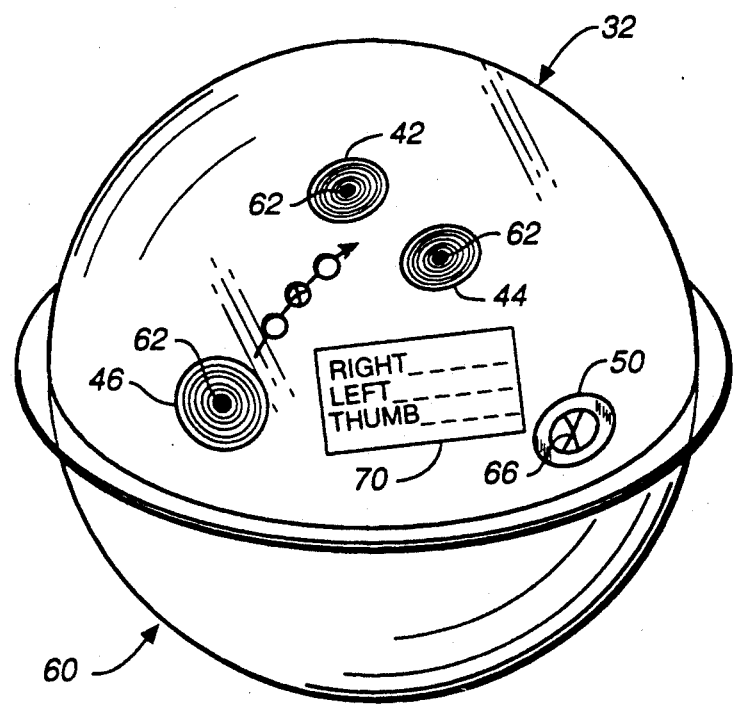
FIG._4

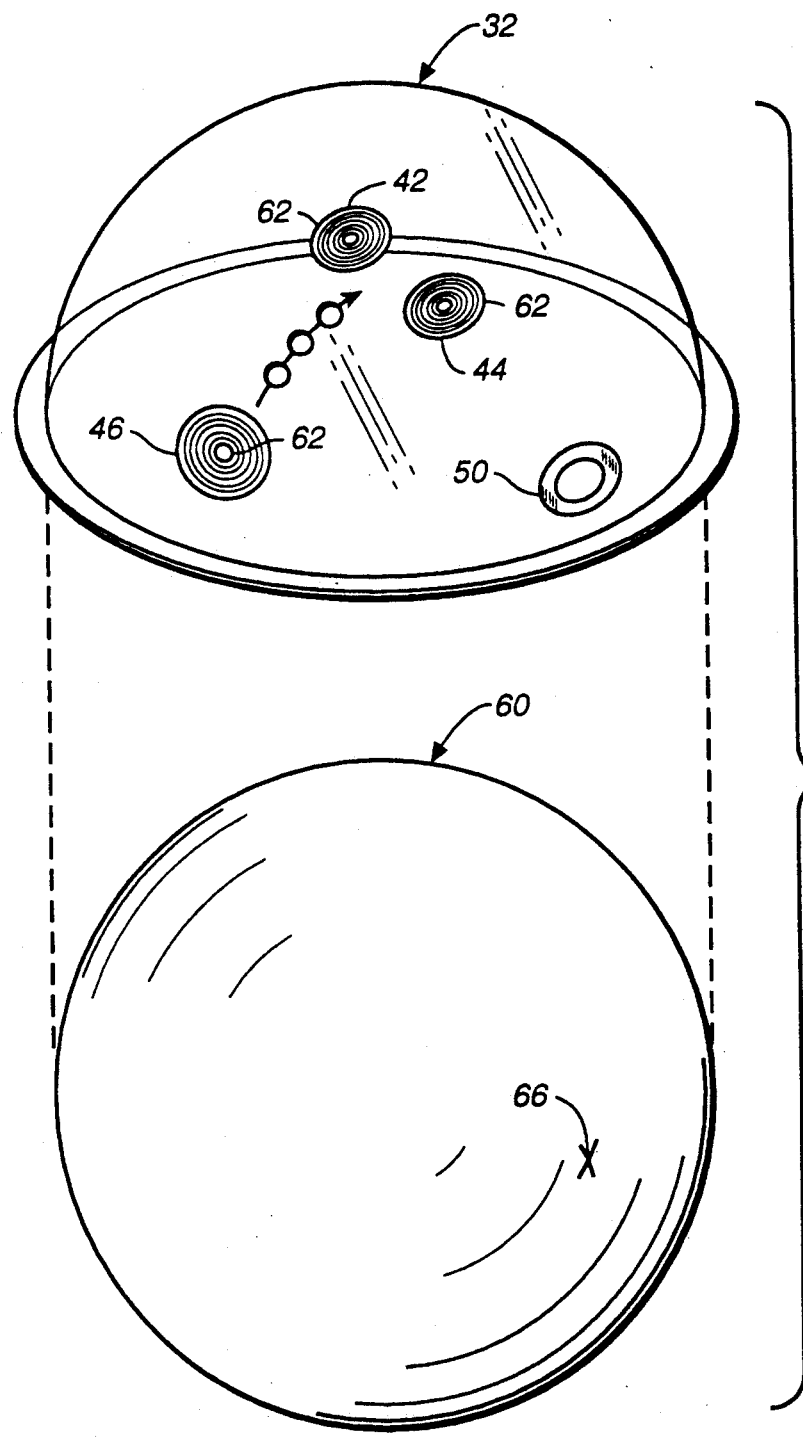
FIG._3

SYSTEM FOR DUPLICATING BOWLING BALL FINGER AND THUMB HOLES

TECHNICAL FIELD

The present invention relates to a system for determining placement of finger and thumb holes on a bowling ball. More particularly, the invention relates to a method and apparatus which is utilized to duplicate the placement of finger and thumb holes on one bowling ball onto another bowling ball.

BACKGROUND ART

A number of approaches are known in the prior art for placing and drilling finger holes in bowling balls. Some of these systems are for the purpose of producing finger holes in one bowling ball which are identical to those of another bowling ball. A representative device of this latter type is that disclosed in U.S. Pat. No. 5,092,054, issued Mar. 3, 1992. The patent discloses an arcuate measuring device for measuring distances along a spherical surface such as a bowling ball. The device includes a curved guide member with measurement marking thereon. A measurement device is slidably retained on the guide member. Removable pins are provided to permit measuring between two finger holes in a bowling ball. An aperture is provided in the measurement device to permit marking a distance on the ball.

U.S. Pat. No. 4,191,357, issued Mar. 4, 1980, discloses a relatively complex device for duplicating in a new bowling ball the exact size, shape, direction, and span of the finger and thumb holes in an existing, used bowling ball.

A patentability search directed to the current invention also located the following U.S. Pat. Nos.: 3,878,762, issued Apr. 22, 1975, 4,742,620, issued May 10, 1988, 3,429,049, issued Feb. 25, 1969, 4,257,165, issued Mar. 24, 1981, 2,706,338, issued Apr. 19, 1955, 4,242,801, issued Jan. 6, 1981, and 3,161,041, issued Dec. 15, 1964.

The duplication of finger and thumb hole locations, i.e. the transfer of locations from one bowling ball to another, has always been a difficult and time consuming task, often requiring the utilization of complex, expensive equipment. Furthermore, prior art systems often require elaborate measurement and marking techniques as well as precise set up of equipment. Of course, the more complex the procedures and equipment, the greater the likelihood that error will occur resulting in incorrect drilling of a new ball.

DISCLOSURE OF INVENTION

The present invention relates to a system which allows for the inexpensive, efficient, and effective transfer of finger and thumb hole locations from one bowling ball to another bowling ball. The finger and hole locations are not only precisely located with respect to each other but also precisely located with respect to the bowler's positive axis point of the bowling ball. The apparatus of the present invention is very simple and inexpensive as compared to prior art approaches. Furthermore, hole location transfer through utilization of the method of the invention is fast and accurate.

The method of the present invention is for transferring finger and thumb hole locations from a first bowling ball having finger and thumb holes to a second bowling ball. The method includes the step of placing a substantially transparent template into engagement with the first bowling ball, the template having an inner surface with a configuration generally conforming to the outer surface of the first bowling ball. The template is positioned relative to the first bowling ball so that the template covers the finger and thumb holes and bowler's positive axis point of the first bowling ball.

After the positioning step, the locations of the first bowling ball finger and thumb holes and positive axis point are marked on the template, which is then removed from the first bowling ball.

The marked template is placed in a transfer position relative to the second bowling ball with the mark on the template designating the location of the first bowling ball positive axis point over the desired position of the bowler's positive axis point on the second bowling ball and the template in engagement with the second bowling ball.

While maintaining the template in engagement with the second bowling ball in the transfer position, the second bowling ball is marked at locations corresponding to the locations of the marks designating the locations of the first bowling ball finger and thumb holes.

According to the method disclosed herein, the step of marking the template comprises adhesively securing marker elements to the template. The marker elements are circular and of a size generally corresponding to the size of the finger and thumb holes.

The apparatus of the present invention is for transferring finger and thumb hole locations from a first bowling ball having finger and thumb holes to a second bowling ball.

The apparatus includes a substantially transparent template for sequential placement on the first bowling ball and the second bowling ball. The template has an inner surface with a configuration generally conforming to the outer surfaces of the first bowling ball and the second bowling ball.

Finger and thumb hole marker elements are on the template. The finger and thumb hole marker elements ar spaced from one another and at locations on the template corresponding to the locations of the first bowling ball finger and thumb holes.

The apparatus additionally comprises a positive axis point marker element spaced from the finger and thumb hole marker elements and corresponding to the location of the bowler's positive axis point of the first bowling ball.

Other features, advantages, and objects of the present invention will become apparent with reference to the following description and accompanying drawings.

BRIEF DESCRIPTION OF DRAWINGS

FIG. 1 is a perspective view of a template constructed in accordance with the teachings of the present invention prior to placement thereof on a first bowling ball having existing finger and thumb holes;

FIG. 1A is a diagrammatic presentation of the first bowling ball marked to designate the center of span thereof;

FIG. 1B is a view similar to FIG. 1A but illustrating diagrammatically a technique for determining the positive axis point of the first bowling ball;

FIG. 2 is a perspective view of the template positioned on the first bowling ball and marker elements on the template;

FIG. 3 is a perspective view of the template having marker elements thereon prior to positioning thereof on a second bowling ball which is to have finger and thumb holes drilled therein; and FIG. 4 illustrates the template with marker elements thereon positioned on the second bowling ball.

BEST MODE FOR CARRYING OUT THE INVENTION

Referring now to the drawings, a first bowling ball 10 is shown having finger holes 12, 14 and a thumb hole 16. It is the object of the present invention to provide a means and method whereby the locations of the finger and thumb holes may be quickly and reliably transferred to another bowling ball.

In practicing the teachings of the present invention, it is important to find the center of span of the first bowling ball 10, and FIG. 1A shows an approach for accomplishing this. The center of a bowler's span is used frequently when obtaining certain measurements such a finger weight, side weight, and top weight of a bowling ball, as well as when setting up a ball to drill exotically balanced lay-outs.

One simple method for locating the span center of a bowling ball is to mark the ball, as shown in FIG. 1A, with lines 18, 20, drawn from the edges of the finger holes to the edge of the thumb hole. Next, a line 22 is drawn between the midpoints of lines 18, 20. Line 22 is measured and marked at the exact center thereof as noted by reference numeral 24. This mark can be made by any suitable means such as a crayon. Mark 24 indicates the center of span of bowling ball 10.

Another step to be carried out when practicing the teachings of the present invention is to locate the positive axis point of bowling ball 10. The positive axis point is the point of intersection between the bowling ball surface and one end of the imaginary axis of rotation of the ball. Several techniques are commonly employed to find the positive axis point of a bowling ball and one such technique will be described, with reference to FIG. 1B.

To determine the positive axis point, the bowler measures an offset from the center of span 24 as shown in FIG. 1B. For a right handed bowler the person marks off approximately five inches to a location 26, and from location 26 a measurement of one inch is taken to a location 28. A piece of adhesive tape (not shown) is then wrapped about the maximum dimension of the ball, i e. the circumference thereof, through location 26. The ball marked with the tape is then bowled and, if properly positioned, the tape will not wobble as the ball rolls down the lane. If the tape wobbles, the person marking the ball 10 must relocate it slightly so that the wobble disappears. The positive axis is the exact center of the circle defined by the tape (to the right of the finger and thumb holes as shown in FIG. 1B for right handed bowlers, and to the left thereof for left handed bowlers). In FIG. 1A the positive axis point has been marked on the ball 10 with an X and is designated by reference numeral 30.

It is now time to utilize the template 32 of the present invention. The template, as shown, is in the form of a hemisphere having an inner surface with a configuration generally conforming to the outer surface of the bowling ball 10. Any suitable material may be utilized to form the template; however, one such suitable material is thin walled, plastic sheeting which has been molded to provide the desired final hemispherical shape. In the illustrated embodiment, a rim 34 projects outwardly from the hemispherical component per se of the template. The template is transparent.

The template 32 is positioned relative to the first bowling ball 10 so that the template covers the finger holes 12, 14 and thumb hole 16, as well as the positive axis point 30 of the bowling ball 10. The inner surface of the template is engaged with the outer surface of the bowling ball.

The template 32 has orienting indicia thereon which assumes a predetermined spacial relationship relative to the finger and thumb holes when the template is in proper position on the first bowling ball. The orienting indicia includes an elongated line 36 having an arrow point at the end thereof as well as spaced openings 38 in the template along the elongated line 36.

As shown in FIG. 2, the template is located so that the elongated line 36 is oriented in a direction bisecting the space between finger holes 12, 14 with the arrowhead pointing in the general direction of the finger holes. The center opening 38 is positioned directly over or closely adjacent to the center of span 24 of the bowling ball 10.

Now the template is marked with marker elements, which in the disclosed embodiments are in the form of stickers or adhesive-backed marker elements. The precise locations of finger holes 14, 16 are marked by finger hole marker elements 42, 44 and the location of thumb hole 16 is designated by thumb hole marker element 46. The finger and thumb hole marker elements illustrated are transparent with concentric circles imprinted thereon. However, any suitable marker element construction may be utilized.

The finger and thumb hole marker elements are applied to the outer surface of template 32 and centered precisely with respect to the finger and thumb holes. Centering should take place relative to the exact centers of the holes themselves and not as measured from the outer bevelled edges of the holes. It is also preferred that the sizes of the marker elements correspond to the dimensions of the finger and thumb holes.

Another adhesive-backed marker element, marker element 50, is applied at positive axis point 30. In the arrangement illustrated, marker element 50 is circular and has an opening at the center which is placed over the X marking the positive axis point 30. It will be appreciated, however, that the marker element 50 may be of any suitable type. For example, the positive axis point marker element may have a dot marking the center.

After the marker elements 42, 44, 46, and 50 have been applied to the template 32, the template is removed from first bowling ball 10 and positioned on a second bowling ball 60 (FIGS. 3 and 4) to which the finger and thumb hole locations are to be transferred. However, before actually utilizing the template to mark the ball 60, the template is pierced at the exact centers of finger and thumb marker elements 42, 44. and 46 to provide apertures 62 therein. This may be accomplished by any suitable cutting or piercing tool or instrument.

The template is positioned on the second bowling ball 60, as shown in FIG. 4, so that the predetermined positive axis point 66 of the second bowling ball is centered within positive axis point marker element 50. When this is done, the adhesive backed finger and thumb marker elements 42, 44, and 46 are positioned with respect to the positive axis point 66 of the second bowling ball as they were with respect to the positive axis point of the first bowling ball.

The second bowling ball finger and thumb hole locations are then marked on the second bowling ball through the apertures 62 as by means of crayon or the like. Thus, the finger and thumb hole locations are quickly, efficiently, and accurately transferred from one bowling ball to another.

The second ball is now is in condition for drilling by suitable prior art drilling equipment (not shown). If desired, the template 32 may carry a label 70 which carries supplemental information the driller will require to drill the ball for its owner. For example, the label will carry such information as angles of hole inclination and hole size. It will be appreciated that the template, once marked, may be used over and over again to transfer finger and hole locations to a succession of balls.

I claim:

1. A method for transferring finger and thumb hole locations from a first bowling ball having finger and thumb holes to a second bowling ball, said method comprising the steps of:
   placing a substantially transparent template into engagement with said first bowling ball, said template having an inner surface with a configuration generally conforming to the outer surface of said first bowling ball;
   positioning said template relative to said first bowling ball so that the template covers the finger and thumb holes and positive axis point of said first bowling ball;
   after said positioning step, marking the locations of said first bowling ball finger and thumb holes and positive axis point on said template;
   removing the template from said first bowling ball;
   placing the template in a transfer position relative to said second bowling ball with the mark on the template designating the location of the first bowling ball positive axis point over the positive axis point of said second bowling ball and the template in engagement with the second bowling ball; and
   while maintaining the template in engagement with the second bowling ball in said transfer position, marking said second bowling ball at locations corresponding to the locations of the marks designating the locations of the first bowling ball finger and thumb holes.

2. The method according to claim 1 wherein said step of marking said template comprises adhesively securing marker elements to said template.

3. The method according to claim 2 wherein said marker elements are circular and of a size generally corresponding to the size of said finger and thumb holes.

4. The method according to claim 1 comprising the additional steps of determining the locations of the center of span of said first bowling ball and placing indicia on said first bowling ball designating the location of the center of span prior to the step of placing the template into engagement with said first bowling ball.

5. The method according to claim 4 wherein said template has orienting indicia thereon, said step of positioning said template relative to said first bowling ball including moving said template relative to said first bowling ball until said orienting indicia assumes a predetermined spacial relationship relative to said finger and thumb holes.

6. The method according to claim 5 wherein said orienting indicia includes an elongated orienting mark, said step of positioning said template relative to said first bowling ball including moving said template relative to said first bowling ball until the space between the finger holes is bisected along the direction of said elongated orienting mark.

7. The method according to claim 6 wherein said orienting indicia additionally includes at least one opening along said elongated orienting mark, said step of positioning said template relative to said first bowling ball additionally including moving said template relative to said first bowling ball until said opening is located substantially at the center of span of said first bowling ball.

8. The method according to claim 3 wherein the step of marking said template additionally comprises forming apertures in said template at the marker elements designating the locations o the first bowling ball finger and thumb holes.

9. The method according to claim 8 wherein said apertures are formed in the centers of said marker elements.

10. The method according to claim 8 wherein the apertures are formed in said template by piercing said template.

11. The method according to claim 9 wherein said step of marking the second bowling ball includes applying marker material to the surface of said second bowling ball when through the apertures formed in said template.

12. Apparatus for transferring finger and thumb hole locations from a first bowling ball having finger and thumb holes to a second bowling ball, said apparatus comprising, in combination:
   a substantially transparent template for sequential placement on said first bowling ball and on said second bowling ball, said template having an inner surface with a configuration generally conforming to the outer surfaces of said first bowling ball and said second bowling ball;
   finger and thumb hole marker elements on said template, said finger and thumb hole marker elements being spaced from one another and at locations on said template corresponding to the locations of the first bowling ball finger and thumb holes; and
   a positive axis point marker element spaced from the finger and thumb hole marker elements and corresponding to the location of the positive axis point of said first bowling ball, at least some of said marker elements being adhesively secured to said template.

13. Apparatus for transferring finger and thumb hole locations from a first bowling ball having finger and thumb holes to a second bowling ball, said apparatus comprising, in combination:
   a substantially transparent template for sequential placement on said first bowling ball and on said second bowling ball, said template having an inner surface with a configuration generally conforming to the outer surfaces of said first bowling ball and said second bowling ball; and
   finger and thumb hole marker elements on said template, said finger and thumb hole marker elements being spaced from one another and at locations on said template corresponding to the locations of the first bowling ball finger and thumb holes, said finger and thumb hole marker elements being circular and of a size substantially corresponding to the size of the finger and thumb holes of said first bowling ball.

14. Apparatus for transferring finger and thumb hole locations from a first bowling ball having finger and thumb holes to a second bowling ball, said apparatus comprising, in combination:

a substantially transparent template for sequential placement on said first bowling ball and on said second bowling ball, said template having an inner surface with a configuration generally conforming to the outer surfaces of said first bowling ball and said second bowling ball; and finger and thumb hole marker elements on said template, said finger and thumb hole marker elements being spaced from one another and at locations on said template corresponding to the locations of the first bowling ball finger and thumb holes, and said template having apertures formed therein at at least some of said marker elements.

15. Apparatus for transferring finger and thumb hole locations from a first bowling ball having finger and thumb holes to a second bowling ball, said apparatus comprising, in combination:

substantially transparent template for sequential placement on said first bowling ball and on said second bowling ball, said template having an inner surface with a configuration generally conforming to the outer surfaces of said first bowling ball and said second bowling ball; and finger and thumb hole marker elements on said template, said finger and thumb hole marker elements being spaced from one another and at locations on said template corresponding to the locations of the first bowling ball finger and thumb holes, said template having orienting indicia thereon for guiding the user in the positioning of the template relative to said first bowling ball finger and thumb holes, said orienting indicia including an elongated orienting mark and at least one opening formed in said template along said elongated orienting mark.

* * * * *